US006580559B2

(12) United States Patent
Döll et al.

(10) Patent No.: US 6,580,559 B2
(45) Date of Patent: Jun. 17, 2003

(54) ELEMENT FOR LIGHTING ROOMS BY SELECTIVE DAYLIGHT GUIDANCE AND METHOD OF MANUFACTURING SUCH AN ELEMENT

(75) Inventors: Walter Döll, Reute (DE); Laszlo Könczöl, Freiburg (DE); Andreas Gombert, Freiburg (DE)

(73) Assignee: Fraunhofer Gesellschaft zur Forderung der angewandten Forschung e.V. (DE)

( * ) Notice: Subject to any disclaimer, the term of this patent is extended or adjusted under 35 U.S.C. 154(b) by 0 days.

(21) Appl. No.: 09/898,291

(22) Filed: Jul. 3, 2001

(65) Prior Publication Data

US 2002/0051296 A1 May 2, 2002

Related U.S. Application Data

(63) Continuation-in-part of application No. 09/463,559, filed on Mar. 7, 2000, now abandoned.

(51) Int. Cl.[7] ........................ G02B 17/00; G02B 27/00; E06B 7/00; E04B 7/18; B29D 11/00

(52) U.S. Cl. ........................ 359/591; 359/595; 359/596; 359/598; 359/609; 52/171.1; 52/200; 52/204.5; 52/402; 264/1.9; 264/2.7; 264/320

(58) Field of Search ................................ 359/595, 591, 359/592, 596, 597, 598, 609; 52/204, 402, 200, 171.1; 264/1.9, 2.7, 320

(56) References Cited

U.S. PATENT DOCUMENTS 2,928,131 A * 3/1960 Mahler ........................ 428/141
4,989,952 A * 2/1991 Edmonds .................... 359/592
5,388,000 A * 2/1995 Bartenbach ................. 359/596
6,040,941 A * 3/2000 Miwa et al. ................ 359/443

FOREIGN PATENT DOCUMENTS

GB 2 255 945 A * 11/1992 ............. B60R/1/08

* cited by examiner

*Primary Examiner*—Russell Adams
*Assistant Examiner*—Magda Cruz
(74) *Attorney, Agent, or Firm*—St. Onge Steward Johnston & Reens LLC

(57) ABSTRACT

What is described here is a method and an element of lighting rooms by selective guidance of daylight, comprising an optically transparent main body through which the light is incident into the respective room, and including plurality of structures on which light is deflected by total reflection into the respective room.

The invention is characterized by the provision that the plurality of structures consists of parallel crazes.

17 Claims, 2 Drawing Sheets

ELEMENT FOR LIGHTING ROOMS BY SELECTIVE DAYLIGHT GUIDANCE AND METHOD OF MANUFACTURING SUCH AN ELEMENT

This is a Continuation-In-Part of Ser. No. 09/463,559 filed Mar. 7, 2000 now abandoned.

FIELD OF THE INVENTION

The present invention relates to an element for lighting rooms by selective daylight guidance, comprising an optically transparent main body through which the light is incident into the respective room, as well as to a method of manufacturing such an element.

A very high importance must be attached to an appropriate illumination with daylight in the working and living environment of man. Daylight used better than this is usual with normal windows would not only result in an improved well-being and a higher productivity in work but would also lead to substantial savings in energy. Architects and illumination designers attempt to take these facts into consideration to an ever-increasing extent with various provisions.

BACKGROUND OF THE INVENTION

A substantial contribution can be achieved with window elements which deflect the light which is available at a high level on the facade selectively into the interior of the rooms beyond the normal measure.

At present prism elements, holographic systems or the like are being used for such light or window elements.

From the German Patent DE 195 38 651 A1, for example, a sun shade device is known which consists of a material transparent to sunlight and which has a planar configuration and a smooth surface which is irradiated by the light. The underside presents at least one prism-type contour having a cross-section including an approximately rectangular triangle.

The known elements hence require the application of expensive main bodies which must then be further processed at a comparatively high expenditure so that they have so far not been widely accepted.

SUMMARY OF THE INVENTION

The present invention is based on the problem of proposing an element for lighting rooms by the selective guidance of daylight, which presents a high optical efficiency in terms of its function and which can be manufactured at reasonable costs.

Moreover, the invention is intended to propose a method of producing such an element.

One inventive element is defined in claim 1. Improvements of this method are the subject matter of claims 2 and 3.

One inventive method of manufacturing such elements is defined in claim 4. Improvements of this method are defined in claims 5 et seq.

In the element characterized in claim 1 a plurality of structure is provided in the optically transparent main body, on which (additional) light is deflected into the respective room by total reflection. The plurality of structures may consist of parallel crazes.

The term "crazes" is to be understood to denote flat wedge-shaped deformation centers producing a variation of the refractive index relative to the basic material, such as those which can be generated in vitreous or glass-like thermoplastic materials in particular. Crazes, i.e. flat wedge-shaped deformation centers, are created on locally excessive stress peaks such as those which occur on the tips of fissures, for instance. Macroscopically they have the appearance of small fissures and propagate in a direction normal on the main direction of tensile stress, just like fissures.

In this concept it is especially important that the refractive index is reduced relative to the index of the basic polymer material whilst at the same time the transition from the basic material to the craze is distinct so that total the transition from the basic material to the craze is distinct so that total reflections are achieved on the crazes, which guide additional light reflections are achieved on the crazes, which guide additional light through the window pane into the respective room to be lighted.

The thermoplastic material may be polymethylmethacrylate (PMMA) in particular. Besides this material, however, other polymers such as polystyrene, polycarbonate etc. may be employed on the condition that they are transparent and that they are suitable for generating the inventive structures therein for supplying additional light into the respective room.

In the inventive method of manufacturing an element for lighting rooms by selective guidance of (additional) daylight, which is appropriate in particular for producing an element according to any of the claims 1 to 4, a plate-shaped main body consisting of a polymer is subjected to a tensile stress applied in parallel with the surface of the plate. This gives rise to the formation of so-called crazes in particular, i.e. flat wedge-shaped deformation centers presenting a refractive index at variance from the index of the basic material.

What is particularly preferred is the concept that during the application of the tensile stress a solvent and especially an organic solvent is additionally applied on the plate surface. The organic solvent is a polar solvent and preferably acetone, ethanol or methanol.

The application of stress and possibly of a solvent can preferably be performed at an elevated temperature below both the glass transition temperature of the polymer material and the boiling temperature of the solvent.

The inventive method is also suitable for processing continuous material webs:

In such a concept it is preferred that a bending device is used to apply or create the tensile stress, through which the plate material is passed in the form of a continuous material web. The principle of the bending device is that bending is applied simultaneously at four points of the plate material by means of rotating cylinders as loading means.

BRIEF DESCRIPTION OF THE DRAWINGS

The invention will be described in the following in more details by the examples of embodiments, without any restriction of the general inventive idea, referring to the drawing which explicit reference is made to in all other respects as far as the disclosure of all inventive details is concerned which are not explained in more details in the text. In the drawing.

DETAILED DESCRIPTION OF THE DRAWINGS

Figure 1:
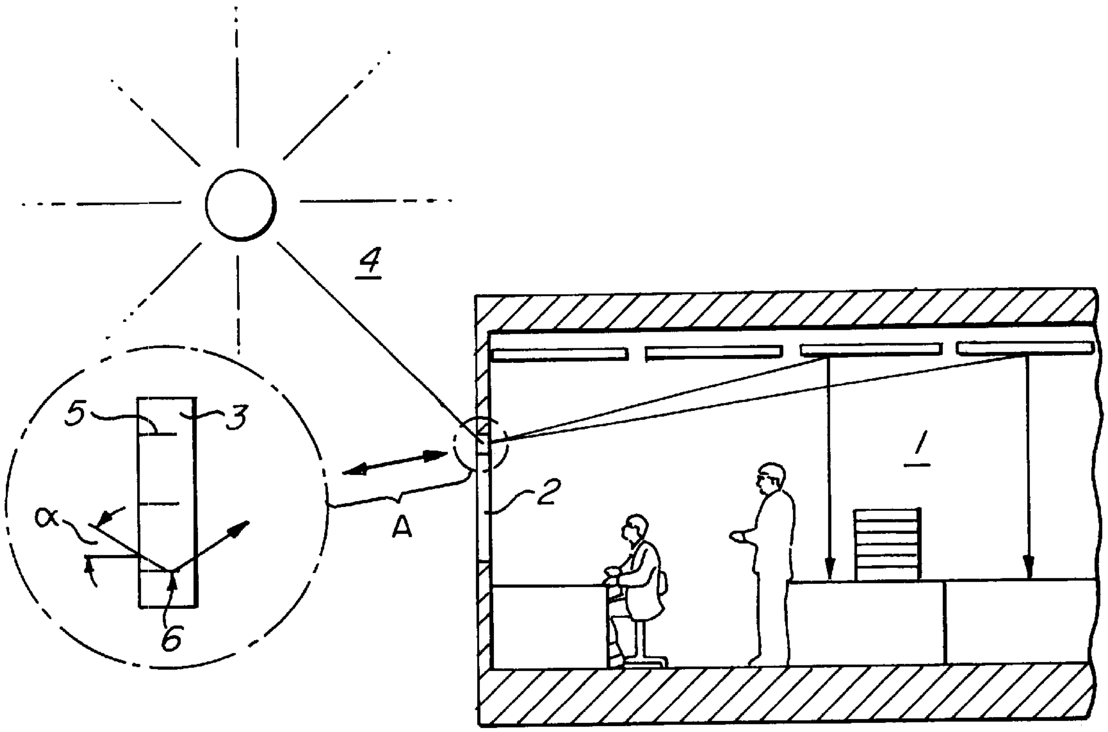
FIG. 1 illustrates the fundamental principle of the invention.

FIG. 1 shows a room, which is lighted, through a window 2. The window 2 comprises a transparent element or a disk 3, which ensures an additional lighting—compared against conventional windows—by selective guidance of daylight 4 into the interior of the room. To this end, the disk 3 presents a plurality of structures 5—as is shown in the enlarged detail view A—on which additional daylight or sunlight 4 is deflected into the room 1 by total reflection 6.

Figure 2:
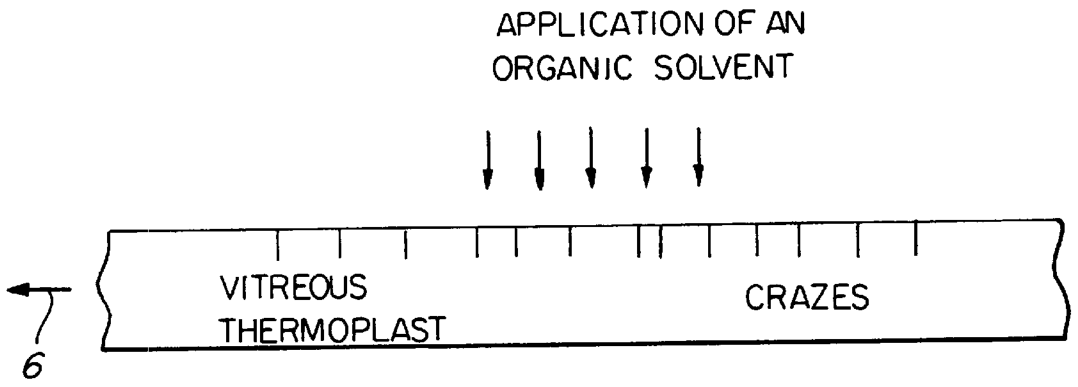
FIG. 2 serves to illustrate the inventive method.

FIG. 2 illustrates an inventive method of manufacturing the inventive structures 5:

A tensile stress is applied to a disk 3 made of a polymer material, preferably a vitreous or glass-like thermoplastic material such as polymethylmethacrylate, which produces its effects in a direction parallel with the surface of the disk 3. At the same time, a solvent and particularly an organic solvent is applied on the surface of the disk 3, and possibly the surface is exposed to an elevated temperature.

As a result, flat wedge-shaped deformation centers are generated which are initiated on locally excessive stress peaks. Macroscopically, they have the appearance of small fissures and propagate, like these fissures, in a direction orthogonal on the direction of the tensile stress. This causes a reduction of the refractive index of the deformation centers, which are also referred to as crazes, relative to the refractive index of the basic polymer material so that total reflection is achieved on the distinct transitions.

Figure 3:
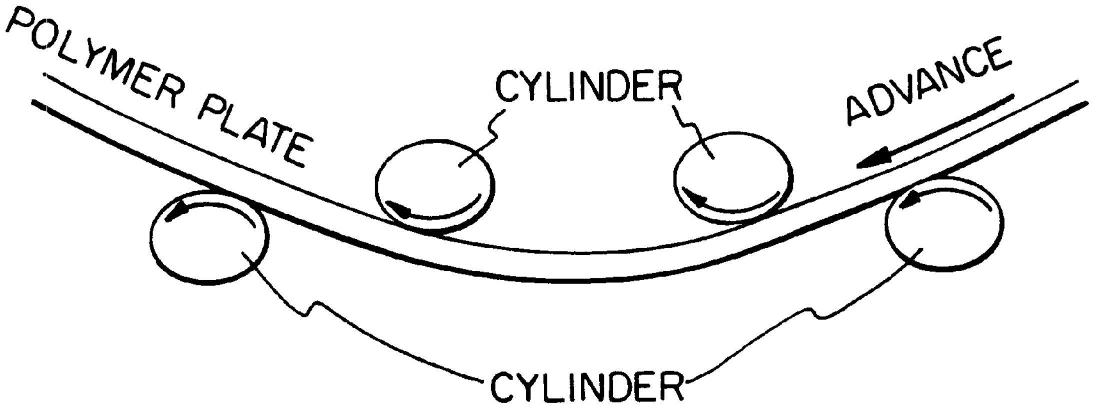
FIG. 3 illustrates the principle of a bending device.

FIG. 3 illustrates the principle of a bending device. Bending is applied simultaneously at four points of the plate material by means of rotating cylinders as loading means.

The following example is given for the purpose of illustrating the present invention and is not intended to limit the scope in any way.

EXAMPLE 1

A daylight element is typically manufactured by bending a long plate of a transparent thermoplastic of 2–5 mm thickness in a 4-point bending apparatus enabling for slow feed of the plate above an open solvent tank. The plastic used could be a polymethylmethacrylate (PMMA) plate of 4 mm thickness and 300 mm width. The plate was bent with a deflection of about 150 mm resulting in a maximum tensile surface stress in the center of the plate of 50 MPa (=N/mm$^2$). The feed of the plate was 200 mm/min resulting in an effective loading time of 1 minute. The solvent tank was filled with acetone and the shortest distance between the solvent surface and the bending plate was about 1 mm. Using this procedure, daylight guidance elements with satisfactory light guiding properties was achieved.

What is claimed is:

1. Element for lighting a room by selective guidance of daylight, comprising an optically transparent main body through which the light is incident into the respective room, and including a plurality of structures on which light is deflected by total reflection into the respective room, wherein said plurality of structures consists of parallel crazes.

2. An element according to claim 1, wherein said crazes are flat wedge-shaped deformation centers having a refractive index as variance from the index of the basic material, in vitreous thermoplastic materials.

3. An element according to claim 2, wherein said thermoplastic material is selected from the group consisting of ploymethylmethacrylate (PMMA), polystyrene and polycarbonate, and combinations thereof.

4. A method of manufacturing an element for lighting a room by selective guidance of daylight comprising the steps of:

providing a plate-shaped main body made of polymer material and having a surface; and applying a tensile strength in parallel with said surface of said plate, thereby creating crazes.

5. A method according to claim 4, wherein the step of applying a tensile strength in parallel with the surface of said plate further comprises applying an organic solvent to said surface.

6. A method according to claim 5, wherein said organic solvent is a polar solvent.

7. A method according to claim 4, wherein the step of applying a tensile strength in parallel with the surface is performed at an elevated temperature.

8. A method according to claim 5, wherein the step of applying an organic solvent onto the surface is performed at an elevated temperature.

9. A method according to any of the claims 4 to 8, characterized in that for the application of the tensile stress a bending device is employed through which the plate material is passed in the form of a continuous material web.

10. A method according to claim 4, wherein the step applying a tensile strength in parallel with said surface of said plate further comprises:

providing a bending device; and passing said plate-shaped main body through said bending device, wherein said plate-shaped main body is in the form of a continuous material web.

11. A method of manufacturing an element for lighting a room by selective guidance of daylight comprising the steps of:

providing a plate-shaped main body made of polymer material and having a surface; and applying a tensile strength in parallel with said surface of said plate, thereby creating crazes, wherein the step of applying a tensile strength in parallel with the surface of said plate further comprises applying an organic solvent to said surface.

12. An element for lighting a room by selective guidance of daylight through an exterior wall of a building wherein the element is made by a process comprising the following steps:

a) providing an optically transparent main body having a surface and made of polymer material;

b) applying a tensile strength in parallel with the surface of the transparent main body in order to create a plurality of parallel crazes on which light is deflected by total reflection into the room.

13. The element for lighting a room by selective guidance of daylight through an exterior wall of a building of claim 12, wherein said step of applying a tensile strength in parallel with the surface of the transparent main body further comprises applying an organic solvent to the surface.

14. The element for lighting a room by selective guidance of daylight through an exterior wall of a building of claim 13, wherein said step of applying an organic solvent to the surface further comprises applying a polar solvent.

15. The element for lighting a room by selective guidance of daylight through an exterior wall of a building of claim 12, wherein said step of applying tensile strength in parallel with the surface further comprises elevating the temperature of the surface.

16. The element for lighting a room by selective guidance of daylight through an exterior wall of a building of claim 13, wherein said step of applying an organic solvent further comprises elevating the temperature of the surface.

17. An element for lighting a room by selective guidance of daylight through an exterior wall of a building of claim 12, wherein said step of providing an optically transparent main body further comprises providing an optically transparent main body in the form of a continuous web material, and passing the web material through a bending device.

* * * * *